Dec. 11, 1962
B. L. McKAMEY
3,068,026
CRYOGENIC FLUID TRANSFER LINE COUPLING
Filed June 13, 1958
3 Sheets-Sheet 1
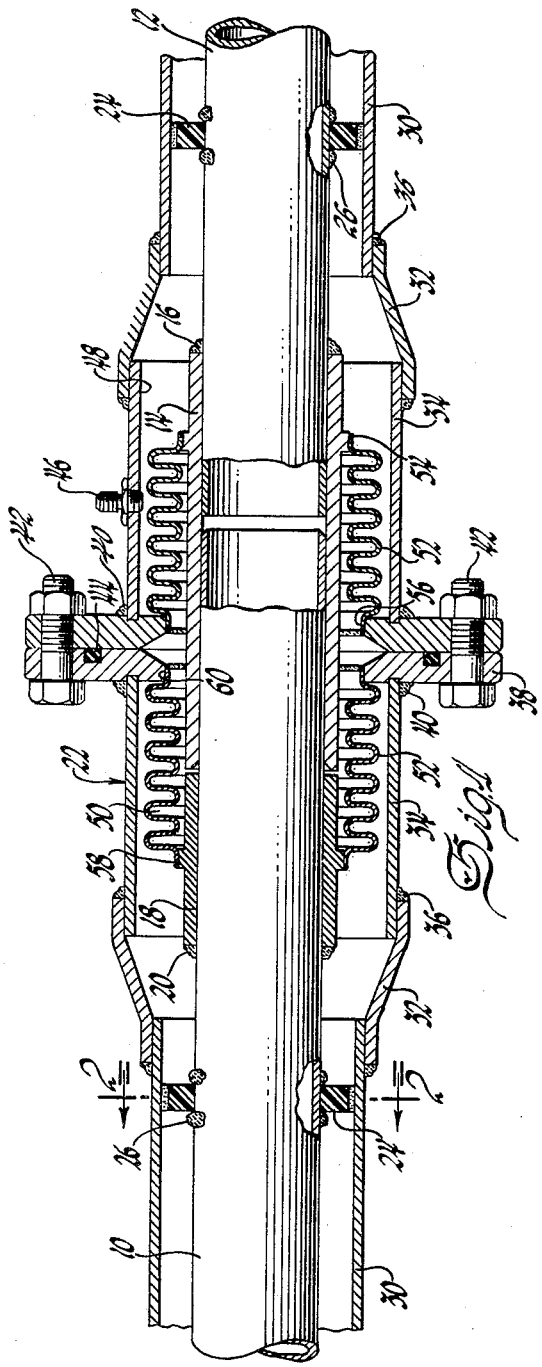
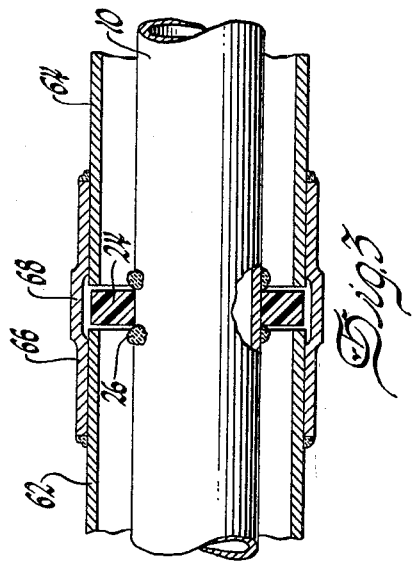
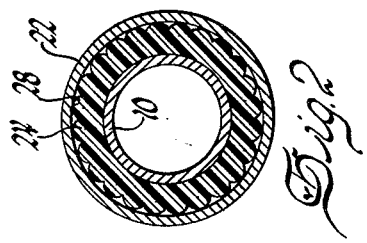
INVENTOR.
Birch L. McKamey
BY
L. D. Burch
ATTORNEY

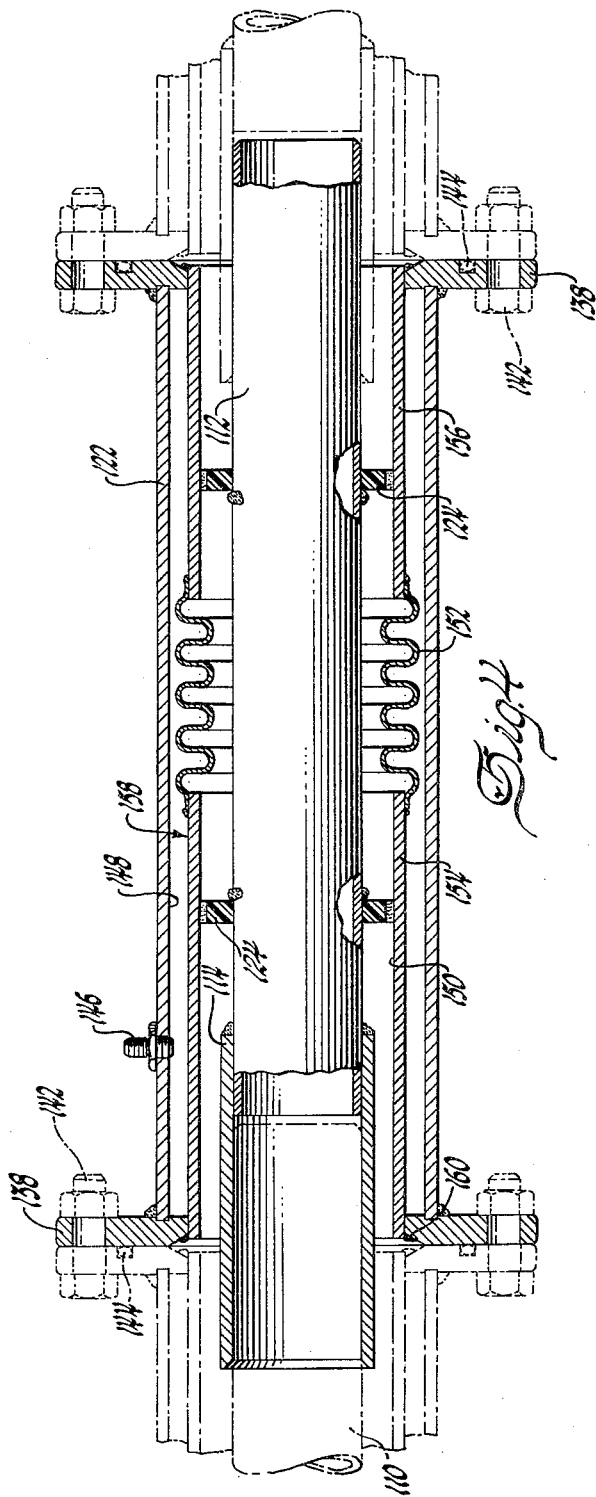

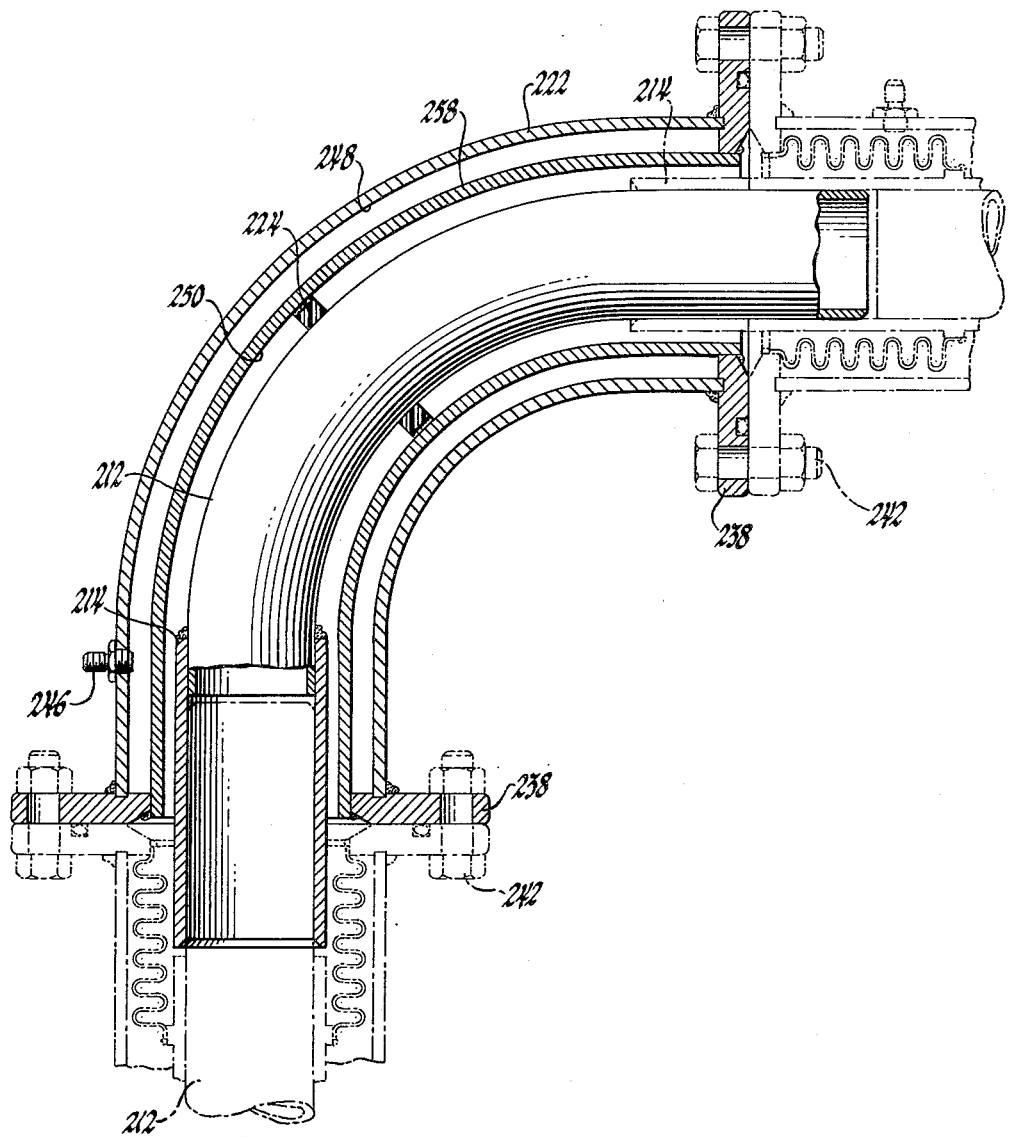

United States Patent Office 3,068,026
Patented Dec. 11, 1962

3,068,026
CRYOGENIC FLUID TRANSFER LINE COUPLING
Birch L. McKamey, Speedway, Ind., assignor to General Motors Corporation, Detroit, Mich., a corporation of Delaware
Filed June 13, 1958, Ser. No. 741,787
2 Claims. (Cl. 285—47)

This invention relates to fluid transfer lines and more particularly to a coupling for an extremely low temperature fluid line.

It is often necessary to transfer fluids, such as liquified air, oxygen, hydrogen, refrigerants, or the like, from one vessel to another or to use lines which transmit such material in connection with their own processing, or in connection with other chemical processes. The material being transferred may have a temperature as low as −450° Fahrenheit and there may easily be a 550° Fahrenheit temperature difference between such fluid and the ambient surrounding air. In order to minimize heat transfer between the fluid and the ambient air, the transfer lines must be properly insulated. It is customary to use a high vacuum in insulating this type of transfer line.

Much difficulty has been had in the past in obtaining a coupling of sufficient quality to prevent the excessive transfer of heat from the fluid to the surrounding air. Perfect seals have been required in the couplings used to prevent the escape of liquid into the vacuum chambers where it gasifies and destroys the vacuum, nullifying its insulating effect. Further, it has been necessary to seal all joints against escape to the atmosphere. The devices have been expensive, difficult to manufacture and have not properly performed the functions expected of such couplings.

The device in which this invention is embodied comprises an inner fluid carrying tube, surrounded by a vacuum chamber, within an outer supporting tube and having an expansible tube section intermediate the inner and outer tubes. With this type of device it is not necessary to incorporate perfect sealing means between the various parts, and between the chambers and the atmosphere, and the possibility of gasified liquid escaping into the vacuum chamber is extremely low. The device is relatively inexpensive to make and the quality of the coupling is better than couplings that have been available in the past.

In the drawings:

FIGURE 1 shows a modification of the fluid transfer line coupling embodying this invention, with parts broken away and in section to properly show the location of the parts.

FIGURE 2 is a cross sectional view along the line 2—2 of FIGURE 1 to illustrate the means for spacing the inner tube with respect to the outer supporting tube.

FIGURE 3 is a view of a portion of FIGURE 1 with parts broken away and in section to show an alternate method of spacing the inner tube from the outer supporting tube.

FIGURE 4 is a second modification of the device with parts broken away and in section to show the relative position of the parts.

FIGURE 5 shows an elbow that may be used with either of the modifications of FIGURES 1 and 4 with parts broken away and in section to illustrate the relative positions of the parts.

Referring more particularly to the drawings, a modification of the invention is shown in FIGURE 1. The cryogenic fluid transfer line is made up of a plurality of conduit sections 10 and 12, which are slidingly connected to convey the cryogenic fluid from one vessel to another, or in the chemical processing line. A sliding connection is accomplished through the use of a sleeve member 14, welded to the tube section 12, as at 16. The sleeve member is received about the adjacent end of the tube section 10 to join the tube portions. A stop sleeve 18 welded to the conduit section 10, as at 20, provides the proper relative location of the tube sections. The inner fluid carrying tube sections 10 and 12 are made of stainless steel, or other suitable material, which has a low coefficient of expansion.

An outer supporting tube, illustrated generally by the numeral 22, is concentrically disposed about the connected inner tube sections and properly spaced therefrom by spacer rings 24. The spacer rings are axially located on the inner tube sections by weld beads 26, on the inner tube sections and on either side of the spacer ring. As shown in FIGURE 2, the spacer ring 24 is scalloped around the outer periphery, as at 28, to minimize the surface contact between the spacer ring and the outer supporting tube 22, thus minimizing heat transfer between the inner and outer tube portions.

The outer supporting tube 22 is formed of a plurality of axial sections such as the lengths 30, the expanding portions 32, and the connecting sections 34. These parts are welded together, as at 36, to provide a vacuum tight assembly. The end of the connecting portion 34 has a flange member 38 welded thereto, as at 40, and the adjacent flanges are fastened together by bolt means 42. A suitable seal, such as an O ring 44, is disposed in the flanged connection to prevent the escape of gas through the joint.

A vacuum fitting 46 is disposed in the outer supporting tube near the flange connection, to provide a means for evacuating the outer chamber 48 formed between the outer supporting tube and the inner fluid carrying tube.

A second chamber 50 is provided in the coupling and around the inner tube connection by bellows sections 52, extending between the sleeve members and the flanges 38. One bellows section is brazed to the sleeve member 14, as at 54, and to the flange member 38, as at 56. A second bellows section is brazed to the stop sleeve 18, on the inner tube section 10, as at 58, and to its adjacent flange, as at 60. Thus, an expansible chamber 50 is provided about the inner tube connection and between the outer and inner tubes.

The inner chamber 50 prevents the escape of gasified liquid into the evacuated chamber 48, as well as to the atmosphere. Only that amount of liquid flowing through the inner tube will escape into the bellows chamber 50 as will produce the same gas pressure as the liquid pressure within the tube. Since there is little heat loss through the vacuum the only appreciable loss will be heat transfer by conduction through the metal bellows sections and between the gas in the inner chamber and the outer tube flanges.

The inner tube is allowed sufficient room for expansion due to gas pressures, and the expansible bellows portions maintain a gas tight inner chamber throughout expansion and contraction of the inner tube.

An alternate spacing means is shown in FIGURE 3 which may be used to prevent overstressing of the bellows sections. The spacer ring 24 is located on the inner tube section 10 by the weld beads 26, as in the modification shown in FIGURE 1. The outer supporting tube tube section, however, is separated into sections 62 and 64, joined by a sleeve 66 having an annular raised portion 68. The spacer ring acts between the two outer tube portions 62 and 64 to act against the ends of those portions with expansion and contraction of the inner tube and prevent excessive movement, and the annular portion 68 allows the evacuation of the chamber formed between the outer and inner tube sections.

FIGURE 4 shows a modification of the device which provides a full inner chamber throughout the length of the inner tube portions. The fluid carrying line is comprised of a plurality of sections 110 and 112, which are slidingly engaged as in the modification of FIGURE 1. The sleeve member 114 is secured to the tube portion 112, and received about the adjacent end of the tube portion 110. The tube sections are thus properly connected to allow fluid transfer therethrough.

The outer supporting tube is formed of a plurality of sections 122 and is concentrically disposed about the inner fluid carrying line. Flanges 138 are formed on either end of the outer tube sections and abut, and are joined to, the flanges of the adjacent outer tube sections by the fastening means 142. Sealing means, such as O rings 144, provide a vacuum tight joint between the flanges. A vacuum fitting 146 is provided in the tube section 122 to allow evacuation of the outer chamber 148.

An intermediate tube, illustrated generally by the numeral 158, is formed of a plurality of sections 154 and 156, joined by expansible means, such as the bellows section 152. The intermediate tube 158 is secured to the flanges 138 of the outer supporting tube, as at 160. Thus, a second or inner chamber 150 is provided between the intermediate tube 158 and the inner fluid carrying tube 112.

Spacer rings 124 are disposed about the inner tube section 112, and are of the type shown in FIGURE 2. Proper spacing is therefore obtained between the various parts, the spacer ring 124 separating the inner tube 112 from the intermediate tube 158, and the flange members 138 separating the intermediate tube 158 from the outer supporting tube 122.

The operation and purpose of this coupling is as described in the modification of FIGURE 1, the outer chamber 148 being evacuated to prevent the transfer of heat, and the inner chamber 150 being provided for gasified liquid escaping from the sliding connection of the inner tube. Again, only that amount of liquid can escape into the inner chamber as will produce the same gas pressure as the liquid pressure within the tube. The only appreciable heat transfer will be by conduction through the intermediate tube and the flange members of the outer supporting tube and to the atmosphere.

FIGURE 5 illustrates an elbow that may be used with either of the modifications of FIGURES 1 and 4 to provide a change in direction of the fluid transfer line. The inner tube section 212 is formed to a suitable bend and has a connecting sleeve 214 at one end, to engage the inner tube section 212 and provide a sliding joint therebetween. The opposite end of the conduit 212 is received in a similar sleeve 214 of the next adjoining tube section to provide sliding joint therebetween. The outer supporting tube section 222 is formed to a suitable bend and has the similar flange members 238 secured to either end. The flange members abut, and are fastened to, the adjacent flanged members of the lines to be connected, by fastening means 242. An intermediate tube section 258, between the outer supporting tube 222 and the inner fluid carrying tube 212, is formed to a suitable bend and secured to the flanged members 238 to define the outer and inner chambers 248 and 250 respectively between the inner and outer tube sections. A vacuum fitting 246 is provided in the outer tube section to allow for evacuation of the outer chamber, and spacer rings 224 are disposed between the inner fluid carrying tube 212 and the intermediate tube 258.

The outer chamber 248 is evacuated to minimize heat transfer between the inner and outer tube sections, and the intermediate tube defines an inner chamber 250 to prevent gas emanating from the inner tube connections from leaking to the evacuated chamber and destroying the vacuum therein. Any expansion in the inner fluid carrying tube will be absorbed in the connecting portions of the coupling.

A cryogenic fluid transfer coupling is thus formed by the above described structures which is relatively inexpensive to produce and still provides a minimum of heat transfer between the cryogenic fluid carrying tube and the ambient surrounding air.

I claim:

1. A cryogenic fluid transfer line coupling comprising a pair of inner fluid carrying tube sections, a sleeve formed on the end of one of said sections and telescopically received about the end of the other of said sections to provide a slidable fluid transferring inner tube connection, a pair of outer supporting tube sections concentrically disposed about said inner tube connection, flanges formed on the adjacent ends of each outer tube section, means to sealingly secure said flanges together to provide a gas tight joint therebetween, an expansible tube concentrically disposed between said outer tube and said inner tube, means to sealingly secure said expansible tube to said outer tube flanges and to said inner tube connection to define first and second chambers between said outer tube and said inner tube, said first chamber being partially located between said outer tube and said expansible tube and being evacuated to minimize heat transfer between said inner and said outer tubes, and said second chamber being formed between said expansible tube and said inner tube to prevent the flow of vaporized fluid emanating from the fluid flowing through said inner tube to said first evacuated chamber.

2. The cryogenic fluid transfer line coupling set forth in claim 1 and further including insulating means spacing said outer tube sections from said inner tube connection to further minimize heat transfer between said inner and said outer tubes.

References Cited in the file of this patent

UNITED STATES PATENTS

| 1,140,633 | Trucano | May 25, 1915 |
| 1,322,014 | Hanna | Nov. 18, 1919 |
| 1,481,255 | Cumfer | Jan. 22, 1924 |
| 1,786,506 | Ray | Dec. 30, 1930 |
| 1,869,021 | Perks | July 26, 1932 |
| 2,732,227 | Kaiser | Jan. 24, 1956 |

FOREIGN PATENTS

| 20,193 | Great Britain | Sept. 25, 1914 |
| 721,497 | France | Dec. 22, 1931 |
| 658,505 | Great Britain | Dec. 15, 1949 |